A. M. LOVETT.
Animal-Traps.
No. 136,842.                      Patented March 18, 1873.
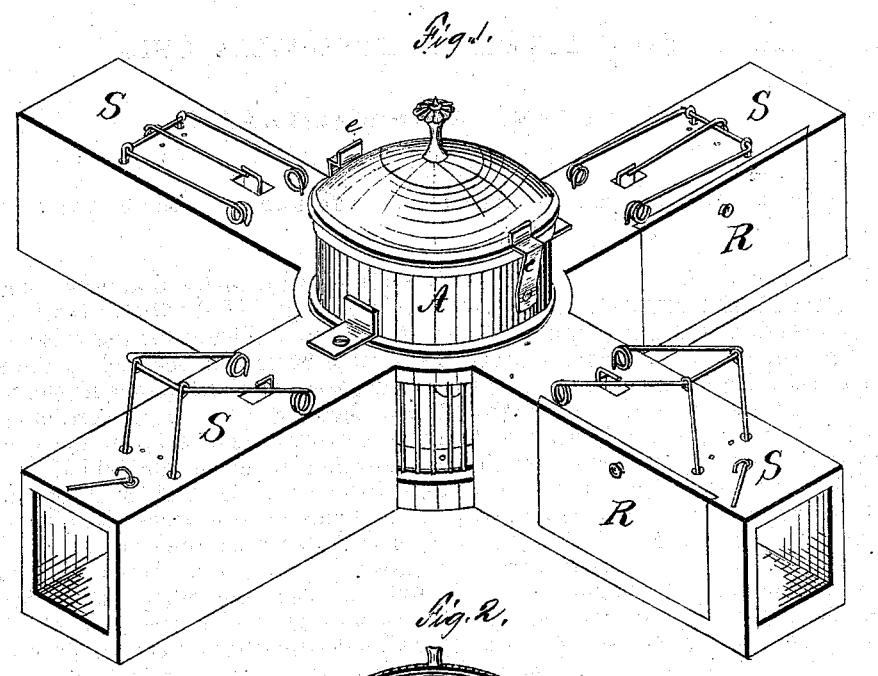
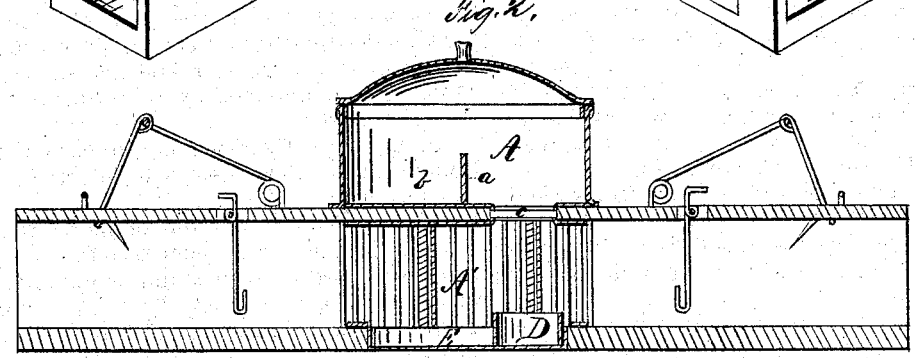
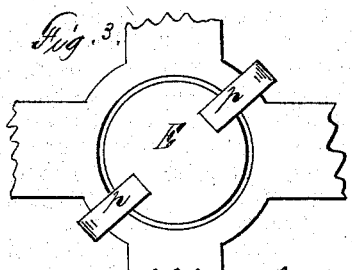
WITNESSES                      INVENTOR

UNITED STATES PATENT OFFICE.

ARMSTEAD M. LOVETT, OF ZANESVILLE, OHIO.

IMPROVEMENT IN ANIMAL-TRAPS.

Specification forming part of Letters Patent No. 136,842, dated March 18, 1873.

*To all whom it may concern:*

Be it known that I, ARMSTEAD M. LOVETT, of the city of Zanesville, in the county of Muskingum and State of Ohio, have invented certain new and useful Improvements in Traps for Rats, Mice, and Game; and I do hereby declare that the following is a full, clear, and exact description thereof that will enable others skilled in the art to which it appertains to make and use the same, reference being had to the accompanying drawing and to the letters of reference marked thereon which form a part of this specification, in which—

My invention relates to an improvement in traps for rats, mice, &c. It consists of decoy-chambers, closed to access, and any number of catch-traps surrounding and attached to this decoy in such a manner as will expose to view from without any live animal that may be confined within the decoy-chamber.

In the drawing, Figure 1 is an isometrical projection of my trap; Fig. 2, a view of the same in vertical section; and Fig. 3, the bottom of the same, showing removable floor of decoy-chamber.

A is the upper decoy-chamber, which is made of metal, secured to the trap in a suitable manner and provided with a cover, secured by spring-clamps $e$, or locked in any desired manner. Into this upper chamber the live animal intended as a decoy is placed. In this apartment is provided a partition, $a$, which divides off a space, $b$, which serves as a bed or nest for the imprisoned decoy. A communication, $c$, admits the prisoner from the chamber A down to the lower decoy-chamber A′, which is surrounded by wires or rods to prevent access or escape and yet to exhibit in plain view the inclosed animal. This lower chamber is provided with a vessel, D, which may hold nourishment for the prisoner, and a removable bottom, E, secured by the slides $p$, for purposes of cleanliness and the introduction of food. S S S S are the ordinary spring-traps surrounding the lower decoy-chamber A′ radiating therefrom, and which are so made and attached as to allow a clear and unobstructed view into the decoy-chamber A′, either through or between the traps. Any desired number of these radial catch-traps may surround the decoy-chamber. R R are sliding doors, through which the bait may be prepared and adjusted and the animal freed from confinement with greater ease and safety than could be accomplished by operating from the entrance of the traps.

Having thus described my invention, what I claim as new, and desire to secure by Letters Patent, is—

1. In connection with one or more traps, S, a decoy-chamber with upper apartment A provided with bed or nest $b$ and communicating with lower apartment A′, the upper chamber having a removable top and the lower a removable bottom or floor, substantially as and for the purpose set forth.

2. The combination of decoy-chamber A and two or more radial traps, S, substantially as and for the purposes herein set forth.

In testimony that I claim the foregoing I have hereunto set my hand and seal this 17th day of December, 1872.

ARMSTEAD M. LOVETT. [L. S.]

Witnesses:
A. J. ANDREWS,
J. B. SLOPPOVER.